(12) United States Patent
Booker

(10) Patent No.: US 7,350,788 B2
(45) Date of Patent: Apr. 1, 2008

(54) CHILD RESTRAINT APPARATUS

(76) Inventor: Christina Kay Booker, 278 N. 150 E., Columbia City, IN (US) 46725

( * ) Notice: Subject to any disclaimer, the term of this patent is extended or adjusted under 35 U.S.C. 154(b) by 308 days.

(21) Appl. No.: 10/669,945

(22) Filed: Sep. 24, 2003

(65) Prior Publication Data

US 2004/0061297 A1   Apr. 1, 2004

Related U.S. Application Data

(60) Provisional application No. 60/413,309, filed on Sep. 25, 2002.

(51) Int. Cl.
*B62B 11/00* (2006.01)
*B62B 9/24* (2006.01)
(52) U.S. Cl. .......................... 280/33.993; 280/33.992; 280/808
(58) Field of Classification Search ............... 280/808, 280/33.992, 33.993, 33.994, 33.991, 290; 297/256.17, 37, 467, 484, 485; 128/869, 128/875, 876
See application file for complete search history.

(56) References Cited

U.S. PATENT DOCUMENTS

| 2,851,033 | A | * | 9/1958 | Posey ..................... 128/870 |
| 3,125,375 | A | | 3/1964 | Bird et al. |
| 3,162,485 | A | | 12/1964 | Prangnell |
| 3,301,594 | A | | 1/1967 | Pukish, Jr. |
| 3,321,247 | A | | 5/1967 | Dillender |
| 3,380,776 | A | | 4/1968 | Dillender |
| 3,612,605 | A | | 10/1971 | Posey, Jr. |
| D224,630 | S | * | 8/1972 | Casavant .................. D3/216 |
| 3,694,029 | A | | 9/1972 | Noble et al. |
| 3,936,092 | A | * | 2/1976 | Dietz ...................... 297/465 |
| 3,941,404 | A | * | 3/1976 | Otaegui-Ugarte .......... 280/733 |
| 3,954,280 | A | | 5/1976 | Roberts et al. |
| 4,050,737 | A | * | 9/1977 | Jordan ..................... 297/465 |
| 4,099,778 | A | | 7/1978 | Lehr |
| 4,226,474 | A | | 10/1980 | Rupert et al. |
| D257,646 | S | * | 12/1980 | Riedell ................... D29/101.1 |
| 4,709,966 | A | | 12/1987 | Parkinson et al. |
| 4,768,795 | A | * | 9/1988 | Mar ......................... 280/30 |
| D300,474 | S | * | 3/1989 | Caulder et al. ......... D29/101.1 |
| 4,854,607 | A | * | 8/1989 | Mandracchia et al. ... 280/801.1 |

(Continued)

OTHER PUBLICATIONS

Leachco™, Inc., Ride 'N Stride #106, 2-in-1 Safety Harness 106, 2003, 1 webpage, http://store.yahoo.com/leachco/13516.html.

(Continued)

*Primary Examiner*—Christopher P. Ellis
*Assistant Examiner*—Bridget Avery
(74) *Attorney, Agent, or Firm*—Barnes & Thornburg LLP

(57) ABSTRACT

A shopping cart having a juvenile restraining apparatus is provided. The juvenile restraining apparatus has shoulder straps, belt segments, and a chest panel. The shoulder straps each have first and second ends and are positionable over the juvenile's shoulders. The first ends of the shoulder straps are selectively attachable to the shopping cart. The second ends of the shoulder straps are attached to the chest panel. The belt segments also have first and second ends with the first ends of each of the belt segments attached to the chest panel. The belt segments extend from the chest panel and are positionable about the torso of the juvenile and are selectively attachable to each other.

12 Claims, 18 Drawing Sheets

U.S. PATENT DOCUMENTS

| | | | |
|---|---|---|---|
| 4,861,109 A | | 8/1989 | Leach |
| 4,867,464 A | | 9/1989 | Cook |
| 5,056,869 A | | 10/1991 | Morrison |
| 5,119,767 A | * | 6/1992 | Jimenez ............... 119/770 |
| 5,135,075 A | | 8/1992 | Aten, Jr. et al. |
| 5,154,487 A | | 10/1992 | Warburton |
| 5,203,613 A | | 4/1993 | Ward |
| D343,257 S | * | 1/1994 | DiFloria et al. ........ D29/101.1 |
| 5,289,896 A | | 3/1994 | Giglio |
| 5,325,818 A | | 7/1994 | Leach |
| 5,378,046 A | | 1/1995 | Gordy et al. |
| 5,503,461 A | * | 4/1996 | Schreier ............... 297/484 |
| 5,624,135 A | | 4/1997 | Symonds |
| 5,641,200 A | * | 6/1997 | Howell ............... 297/256.17 |
| 5,649,744 A | | 7/1997 | Apodaca |
| 5,660,445 A | | 8/1997 | Murray |
| 5,664,844 A | * | 9/1997 | Greene ............... 297/485 |
| 5,676,398 A | | 10/1997 | Nurtsch |
| 5,676,426 A | | 10/1997 | Herring |
| 5,733,014 A | | 3/1998 | Murray |
| 5,839,965 A | | 11/1998 | Mullins |
| 5,927,235 A | | 7/1999 | Olaiz |
| 6,095,613 A | * | 8/2000 | Ostrander et al. ........ 297/467 |
| 6,109,698 A | | 8/2000 | Perez |
| 6,186,521 B1 | | 2/2001 | Divoky et al. |
| 6,364,417 B1 | * | 4/2002 | Silverman ............... 297/464 |
| 6,409,272 B1 | * | 6/2002 | Martin et al. ............... 297/484 |
| 6,547,334 B1 | * | 4/2003 | Girardin ............... 297/484 |
| 6,857,430 B2 | * | 2/2005 | Morris ............... 128/869 |

OTHER PUBLICATIONS

Leachco™, Inc., Wiggle Wrap #100, Safe Seating Wrap, 2003, 1 webpage, http://store.yahoo.com/leachco/13505.html.

Leachco™, Inc., The Wrap Strap #211, Anwhere Safety Strap, 2003, 1 webpage, http://store.yahoo.com/leachco/wrapstrap.html.

Leachco™, Inc., Seat-Me-Safe #104, Booster Chair Safety Belt, 2003, 1 webpage, http://store.yahoo.com/leachco/seatmesafe.html.

Leachco™, Inc., Safe Shopper Set #220, Support Seat & Handle Cover, 2003, 1 webpage, http://store.yahoo.com/leachco/13517.html.

Mommy's Helper, Inc., Kid Keeper Safety Harness, Item No. 10101, UPC# 10101-7, 2002, 1 webpage, http://www.mommyshelperinc.com/flashsite/140.htm.

Safety 1st, 00176 Safety Harness, 1 webpage, http://www.safety1st.com/product.asp?productID=219.

Netkidswear.com, The Baby Superstore, Safety Harness & Handstrap by Gerber, #76232, 1 webpage, http://www.netkidswear.com/safharhan.html.

Babyant.com, Sesame Street Elmo Harness & Handstrap by: The First Years, 1 webpage, http://www.babyant.com/bv022047.html.

BabyAbby™, BabiesRUs.com, Basic Comfort—Cart Along, Item #20080, 2002-2003 Basic Comfort, Inc., 1 webpage, http://www.basiccomfort.com/item.asp?item=20080.

SafeFit, 50043 Baby-In-Sight, Safe 'N Secure™, 1 webpage, http://www.safefit.com/2003/products/50084.htm.

Buggy Guddy Shopping Cart Safety Seat, 2 webpages, http://www.buggybuddy.com/.

Six photographs of prior art shopping carts.

\* cited by examiner

CHILD RESTRAINT APPARATUS

RELATED APPLICATIONS

The present application is related to and claims priority to U.S. Provisional Patent Application, Ser. No. 60/413,309 filed on Sep. 25, 2002, entitled Child Restraint System. The subject matter disclosed in that provisional application is hereby expressly incorporated into the present application.

TECHNICAL FIELD

The present disclosure relates to shopping carts, and more particularly, to child restraining apparatus for the same.

BACKGROUND AND SUMMARY

There exist numerous child restraint apparatus that are incorporated into shopping carts. Typically, such restraining apparatus are used to restrict the mobility of a juvenile who is placed in the seat of a shopping cart. Limiting the mobility of the juvenile serves at least two purposes. First, by limiting the juvenile's movement, the juvenile is less likely to fall from the shopping cart and become injured. Second, by limiting the juvenile's movement, it becomes less likely the juvenile will be able to reach items in proximity of the shopping cart. Conventional restraining apparatus on shopping carts are lap belts that buckle around the waist of the juvenile. Restraining the juvenile with only a single lap belt, however, might allow the juvenile to escape, resulting in the aforementioned consequences.

It would be beneficial to provide a juvenile restraining apparatus in an alternate configuration to better perform the above-described and other functions of conventional lap belts.

Accordingly, an illustrative embodiment of the present invention provides a shopping cart having a seat for supporting a juvenile, a first bar, a second bar extending from the first bar, and a child restraining apparatus. The juvenile restraining apparatus comprises two shoulder straps, two belt segments, and a chest panel. The two shoulder straps have first and second ends with the first and second shoulder straps positionable over the juvenile's shoulders. The first ends of the first and second shoulder straps are selectively attachable to the first bar. The second ends of the first and second shoulder straps are attached to the chest panel. The belt segments have first and second ends, with the first ends of each of the belt segments attached to the chest panel. The belt segments extend from the chest panel and are positionable about the torso of the juvenile. The second ends of the belt segments are selectively attachable to each other.

In the above and other illustrative embodiments, the shopping cart with the juvenile restraining apparatus may also provide: first and second shoulder straps being adjustable with respect to a chest panel; the second ends of the first and second shoulder straps each comprising a clasp; first and second shoulder straps being substantially parallel to each other; a support strap connecting the first and second shoulder straps; first and second belt segments being adjustable with respect to a chest panel; a chest panel comprising a padded material; a crotch strap having first and second ends with the first end attached to a chest panel and the crotch strap extending from the chest panel in a direction opposed to the first and second shoulder straps; a crotch strap with the second end being selectively attachable to a third bar located adjacent to the seat; a crotch strap being adjustable with respect to a chest panel; a crotch strap with the second end comprising a clasp; a crotch strap having an attachment located adjacent to the first end with the second end being selectively attachable to the attachment; and a crotch strap with the first end being selectively attachable to a chest panel.

Another illustrative embodiment of the present invention provides a shopping cart having a seat for supporting a juvenile, a first bar, a second bar extending from the first bar, and a child restraining apparatus. The child restraining apparatus comprises first and second shoulder straps, a chest panel, and first and second belt segments. The first and second shoulder straps are positionable over the juvenile's shoulders with the first and second shoulder straps having first and second ends. The first ends of the first and second shoulder straps are attached to the chest panel. The second ends of the shoulder straps are extendable around the first bar and are selectively attachable to the chest panel. The belt segments extend from the chest panel and are positionable about the torso of the juvenile. The second ends of the belt segments are selectively attachable to each other.

Another illustrative embodiment of the present invention provides a shopping cart having a seat for supporting a juvenile, a first bar, a second bar extending from the first bar, and a child restraining apparatus. The child restraining apparatus comprises first and second shoulder straps, first and second support straps, and a belt strap. The first and second shoulder straps are positionable over the juvenile's shoulders, with the first and second shoulder straps having first and second ends. The first ends of the first and second shoulder straps are selectively attachable to the first bar. The first and second support straps each have first and second ends, with the first and second support straps each being connected to the first and second shoulder straps. The belt strap has first and second ends, with the belt strap being connected to the first and second shoulder straps, and with the first and second ends of the belt strap being selectively attachable to each other.

In the above and other illustrative embodiments, the shopping cart with the child restraining apparatus may also provide: first and second shoulder straps being adjustable with respect to the belt strap; first and second shoulder straps being attached to the first bar; a second support strap comprising third and fourth support straps, each having first and second ends, with the first end of the third shoulder strap connected to the first shoulder strap, and the first end of the fourth support strap attached to the second shoulder strap, with the second ends of the third and fourth support straps being selectively attachable to each other; at least one of the first or second ends of a belt strap being adjustable with respect to the first and second shoulder straps; a crotch strap having first and second ends, with the first end being attached to a belt strap, and with the crotch strap extending from the belt strap in a direction opposed from the first and second shoulder straps; a crotch strap being selectively attachable to a belt strap; a fifth support strap having first and second ends, with the first and second ends being attached to a belt strap, and a crotch strap with the first end being attached to the fifth support strap and extending from the fifth support strap in a direction opposed from the first and second shoulder straps; the second end of the crotch strap being selectively attachable to a third bar located adjacent to the seat; and a crotch strap being selectively attachable to a fifth strap and attached to a third bar.

Another illustrative embodiment of the present invention provides a shopping cart having a seat for supporting a juvenile, a first bar, a second bar extending from the first bar, and a child restraining apparatus. The child restraining apparatus comprises first and second shoulder straps, first, second, and third support straps, and a belt strap. The first and second shoulder straps are positionable over the shoulders of the juvenile, with the first and second shoulder straps having first and second ends. The first ends of the first and second shoulder straps are selectively attachable to the first bar. The first and second support straps, each having first and second ends, are connected to the first and second shoulder straps. The belt strap has first and second ends. The second end of the first shoulder strap is attached to the belt strap. The second end of the second shoulder strap comprises a loop such that at least one end of the belt strap is able to extend around the juvenile's torso and through the loop. The first and second ends of the belt strap are selectively attachable to each other.

Another illustrative embodiment of the present invention provides a shopping cart having a seat for supporting a juvenile, a first bar, a second bar extending from the first bar, and a child restraining apparatus. The child restraining apparatus comprises first and second shoulder straps and a belt strap. The first and second shoulder straps are positionable over the shoulders of the juvenile, with the first and second shoulder straps having first and second ends. The first ends of the first and second shoulder straps are selectively attachable to the first bar. The second ends of the first and second shoulder straps are attached to the belt strap. The belt strap has first and second ends with the first and second ends being selectively attachable to one another.

Additional features and advantages of the child restraint apparatus will become apparent to those skilled in the art upon consideration of the following detailed description of the illustrated embodiment exemplifying the best mode of carrying out the child restraint apparatus as presently perceived.

BRIEF DESCRIPTION OF DRAWINGS

The present disclosure will be described hereafter with reference to the attached drawings which are given as non-limiting examples only, in which.

Figure 1:
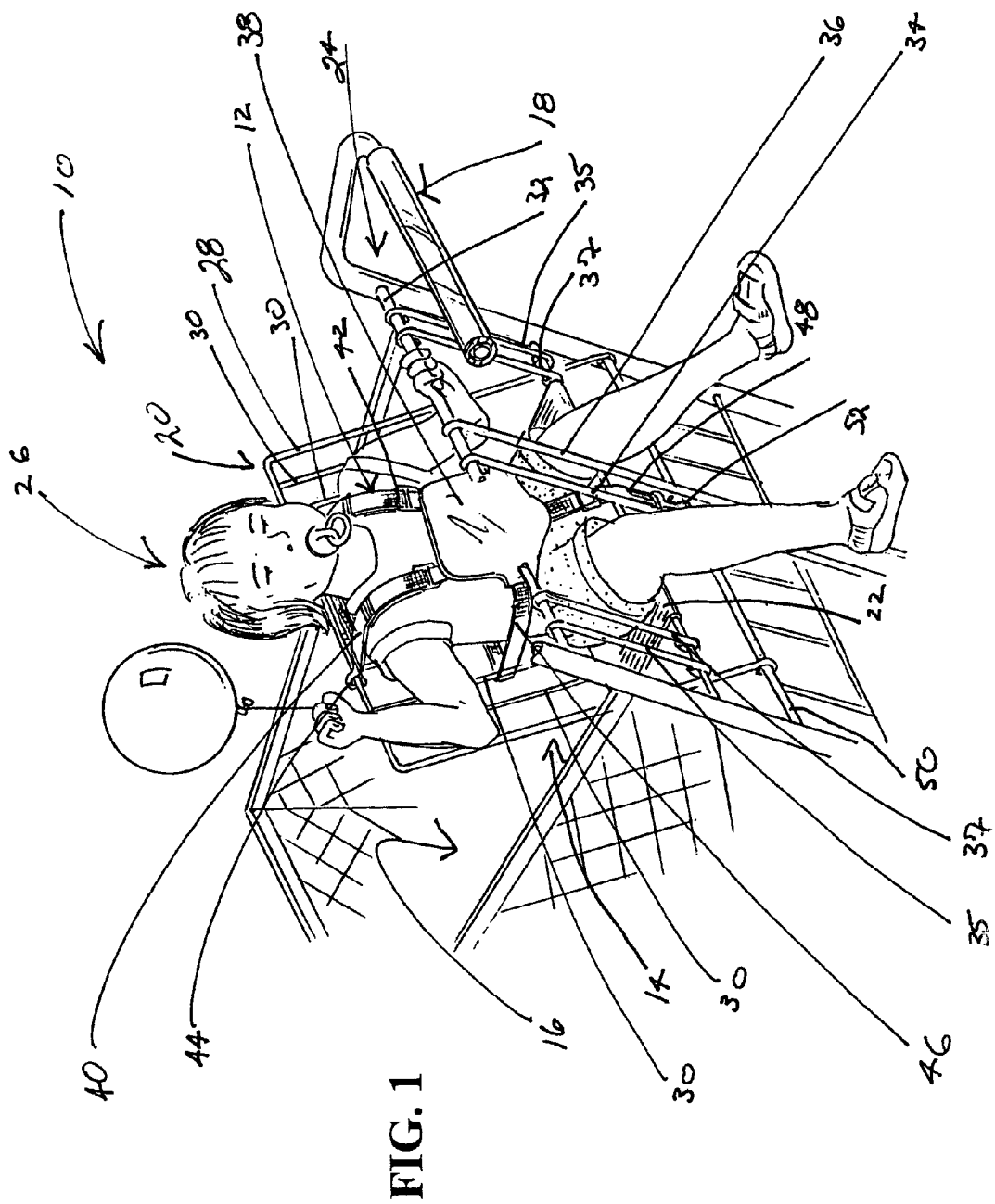
FIG. 1 is a perspective view of an illustrative embodiment of a shopping cart with a child restraining apparatus.

Corresponding reference characters indicate corresponding parts throughout the several views. The exemplification set out herein illustrates embodiments of the child restraining apparatus, and such exemplification is not to be construed as limiting the scope of the child restraining apparatus in any manner.

DETAILED DESCRIPTION

A perspective view of one illustrative embodiment of a shopping cart 10 with a child restraining apparatus 12 is shown in FIG. 1. Shopping cart 10 includes a seat assembly 14, a receptacle area 16, and a hand rail 18. Seat assembly 14 illustratively comprises seatback portion 20, seat portion 22, and seatfront portion 24. Seat assembly 14 is configured to accommodate juvenile 26, as illustratively shown in FIG. 1. Seatback portion 20 is positional rearwardly of juvenile 26, and is illustratively composed of a bar 28 which illustratively defines the periphery of a seatback. A plurality of bars 30, as illustratively shown, extend transversely from bar 28, forming a backrest for juvenile 26. Seat assembly 14 further comprises a railing 32 located forwardly of juvenile 26. Railing 32 is generally transverse to juvenile 26, and serves as a barrier to the same. Seatfront portion 24 comprises bars 34 and 36 which illustratively extend downwardly from railing 32. Bars 34 and 36, in conjunction with bars 35 and 37, serve as dividers through which the legs of juvenile 26 extend, as illustratively shown in FIGS. 1 and 2.

The combination of the seatback and seatfront portions 20 and 24, respectively, provide barriers to juvenile 26, but do not substantially restrict movement. Accordingly, shopping cart 10 provides a child restraining apparatus 12 for restraining juvenile 26. An illustrative embodiment of child restraining apparatus 12 is shown comprising a chest panel 38 located on a portion of the child's torso. In FIG. 1, a portion of railing 32 is cut away to better depict chest panel 38. Alternative embodiments of chest panel 38 may comprise various materials, such as foam or any other general padding-type material. In one illustrative embodiment, chest panel 38 comprises fleece padding fabric surrounded by two pieces of sport-nylon fabric. Shoulder straps 40 and 42 extend over the shoulders of juvenile 26, and are attached to chest panel 38. In this illustrative embodiment, shoulder straps 40, 42 are sewn to chest panel 38. It is appreciated, however, that the attachment can be made by any variety of means, including fasteners or clasps, for example. Shoulder straps 40, 42 are illustratively selectively attachable to bar 28 via clasps 44. (See, also, FIG. 3.) It is contemplated that the selective attachments of shoulder straps 40, 42 to bar 28 can be accomplished by any variety of means known to those skilled in the art, including fasteners, buckles, snaps, Velcro, or hooks, for example.

In addition, shoulder straps 40 and 42, belt strap 46, and crotch strap 48 can be made from any variety of suitable strapping materials. For example, the material may be a polypropylene fabric woven into strapping material.

A belt strap 46 illustratively extends from chest panel 38 and about the torso of juvenile 26 to further limit movement. The belt strap 46 also extends about a portion of at least one bar 30. (See, also, FIG. 3.) In this illustrative embodiment, belt strap 46 is sewn to chest panel 38. It is appreciated, however, that the attachment can be made by any variety of means, including fasteners or clasps, for example. In the illustrated embodiment, a crotch strap 48 is attached to chest panel 38. Crotch strap 48 is positioned between the legs of juvenile 26 to further restrict movement. Crotch strap 48 is illustratively sewn to chest panel 38. It is appreciated, however, that the attachment can be made by any variety of means, including fasteners or clasps, for example. Crotch strap 48 is selectively attachable to bar 50 via clasp 52. It is appreciated, however, that clasp 52 may selectively attach to any of the plurality of bars conventional to many shopping carts. Alternative embodiments of clasps 44 and 52 may comprise various materials such as plastics or metals. In this illustrative embodiment, clasps 44 and 52 are metal, spring-loaded, swivel hooks which allow for selective attachment to bar 50.

Figure 2:
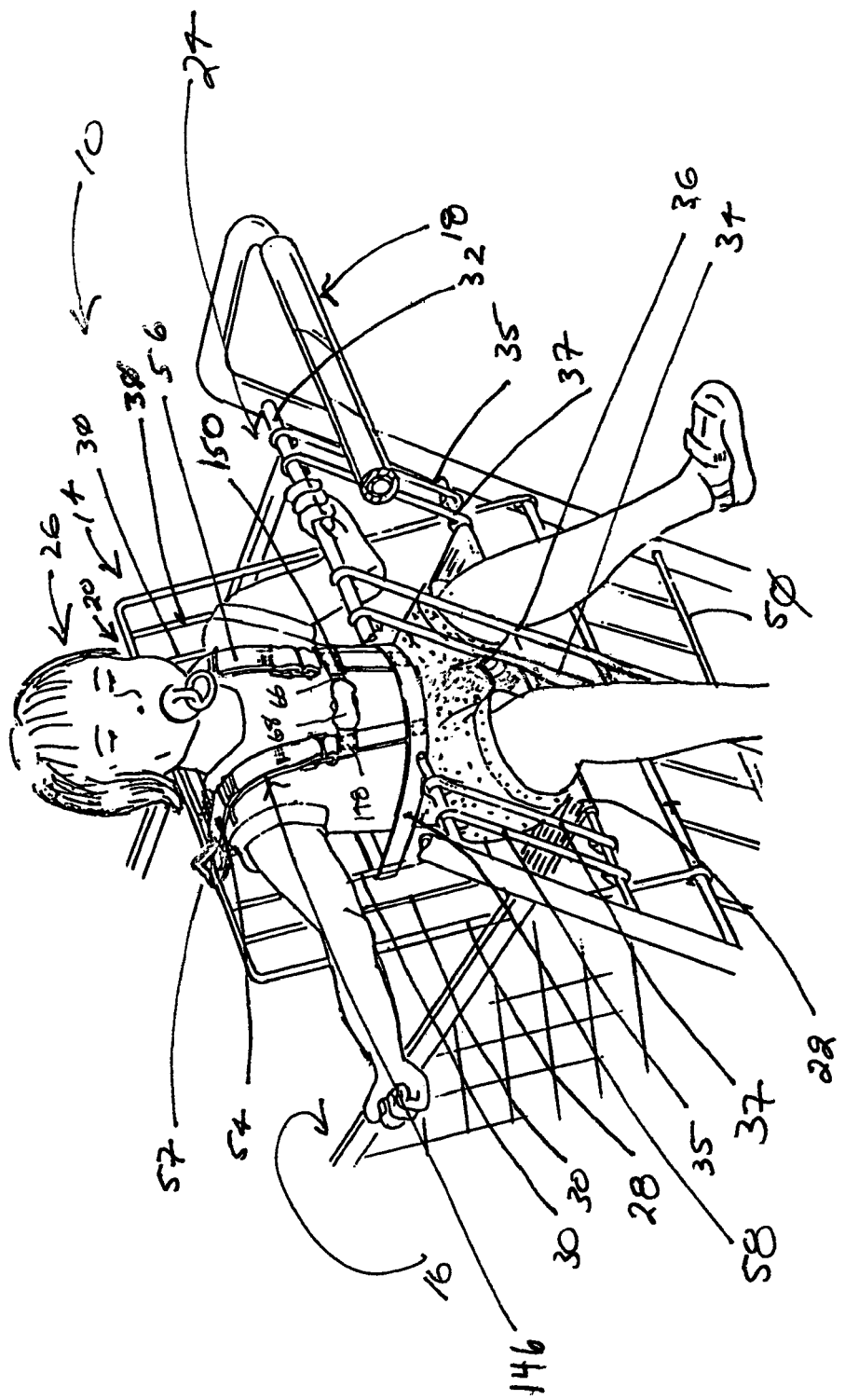
FIG. 2 is a perspective view of another illustrative embodiment of the shopping cart with a child restraining apparatus.

Another illustrative embodiment of shopping cart 10 with a child restraining apparatus 146 is shown in FIG. 2. Child restraining apparatus 146 comprises shoulder straps 54 and 56. Shoulder straps 54, 56 extend over the shoulders of juvenile 26 and are attached to belt strap 58. Straps 148, 150 are attached to shoulder straps 54, 56, respectively, with shoulder straps 54, 56 both attached to belt strap 58. In this illustrative embodiment, straps 148, 150 are sewn to shoulder straps 54, 56, respectively, and shoulder straps 54, 56 are sewn to belt strap 58. It is appreciated, however, that these attachments can be made by any variety of means, including fasteners or clasps, for example. Shoulder straps 54, 56 are illustratively attached to bar 28 via clasps 57. (See, also, FIG. 4.) It is contemplated that the selective attachments of shoulder straps 54, 56 to bar 28 can be accomplished by any variety of means, including buckles, snaps, Velcro, or hooks, for example.

Straps 148, 150 are illustratively selectively attachable to each other as shown in FIG. 2. Straps 148, 150 are attached to buckle portions 68, 66, respectively. This embodiment shows buckle portions 66, 68 to be a plastic buckle wherein one buckle portion, 66, fits into the other buckle portion, 68, thereby connecting the two. It is appreciated, however, that the buckle portions 66, 68 can connect by any variety of means, including fasteners or clasps, and can be comprised of various materials, such as metals. Belt strap 58 extends about the torso of juvenile 26 to further restrict movement. Belt strap 58 also extends about a portion of at least one bar 30. (See, also, FIG. 4.) Straps 54, 56, and belt strap 58 may be made from a polypropylene fabric woven into strapping material, for example.

Figure 3:
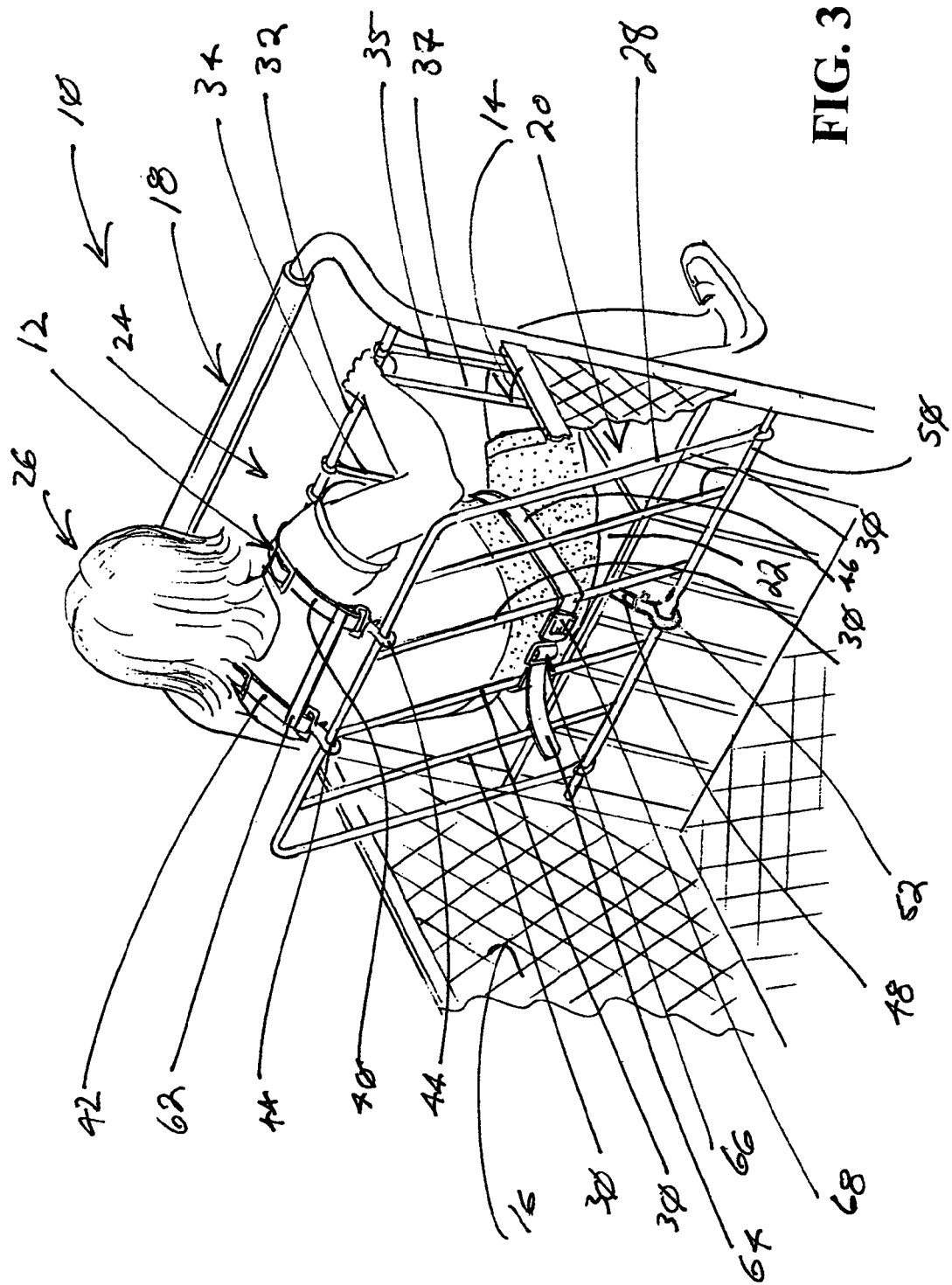
FIG. 3 is another perspective view of the illustrative embodiment of the shopping cart with a child restraining apparatus shown in FIG. 1.

A rear perspective view of shopping cart 10 and child restraining apparatus 12 is shown in FIG. 3. Support strap 62 is illustratively attached to shoulder straps 40, 42. Support strap 62 assists in maintaining the relative positions of shoulder straps 40, 42 with respect to each other. In this illustrative embodiment, shoulder straps 40, 42 are sewn to support strap 62. Belt strap 64, similar to belt strap 46, extends from chest panel 38, as shown in FIG. 1. Belt strap 64 is also attached to chest panel 38 in a same manner as belt strap 46, and may be made of similar strapping materials as well. Belt strap 46 is attached to buckle portion 68 and belt strap 64 is attached to buckle portion 66. Belt straps 46, 64 are selectively attachable with each other via buckle portions 66 and 68 by the manner previously discussed.

Figure 4:
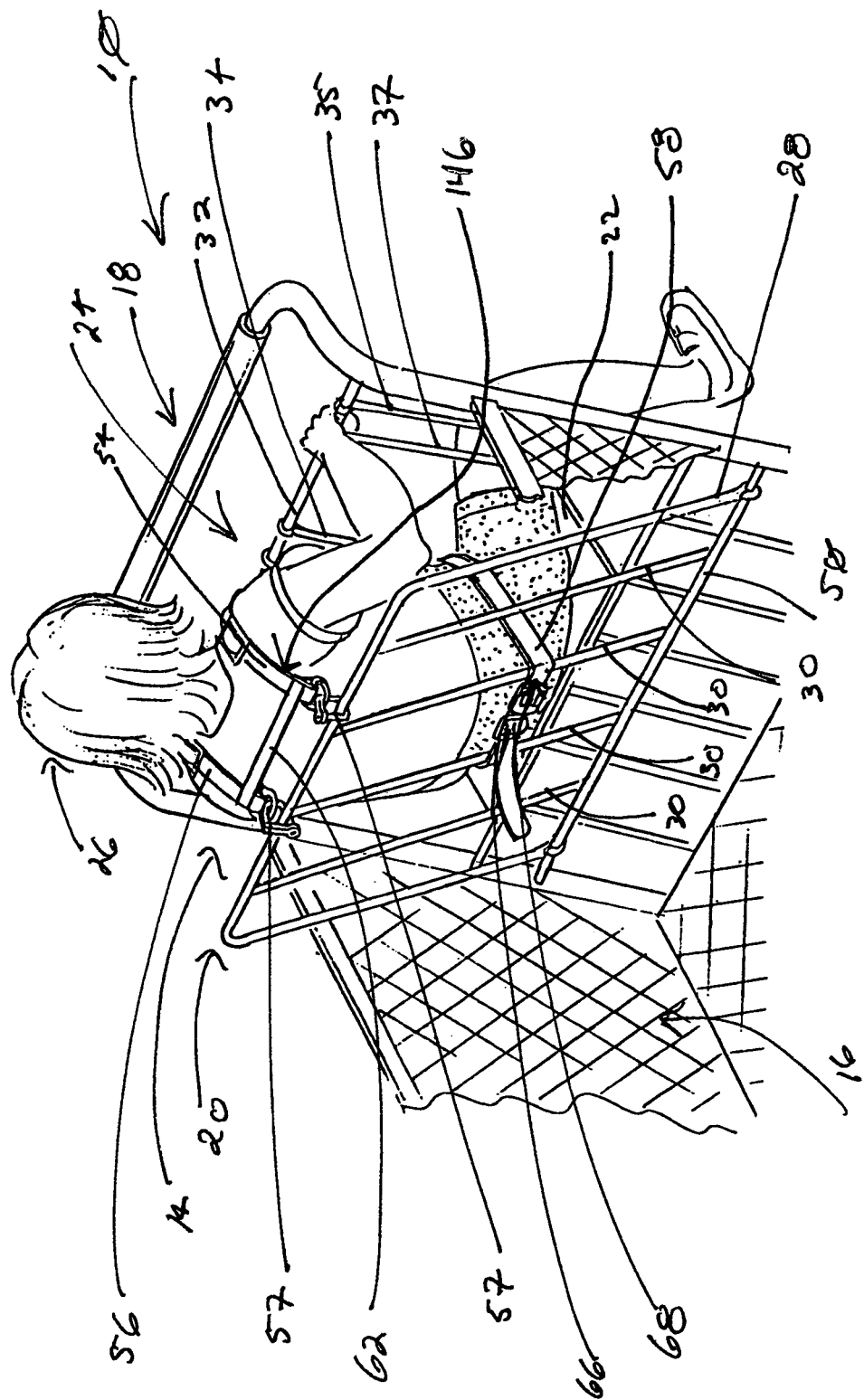
FIG. 4 is another perspective view of the illustrative embodiment of the shopping cart with a child restraining apparatus shown in FIG. 2.

A rear perspective view of shopping cart 10 and child restraining apparatus 146 is shown in FIG. 4. Illustratively, support strap 62 is attached to shoulder straps 54, 56, similar to child restraining assembly 12 shown in FIG. 3. The ends of belt strap 58 are illustratively shown to couple via buckle portions 66, 68 by the manner previously discussed.

Figure 5:
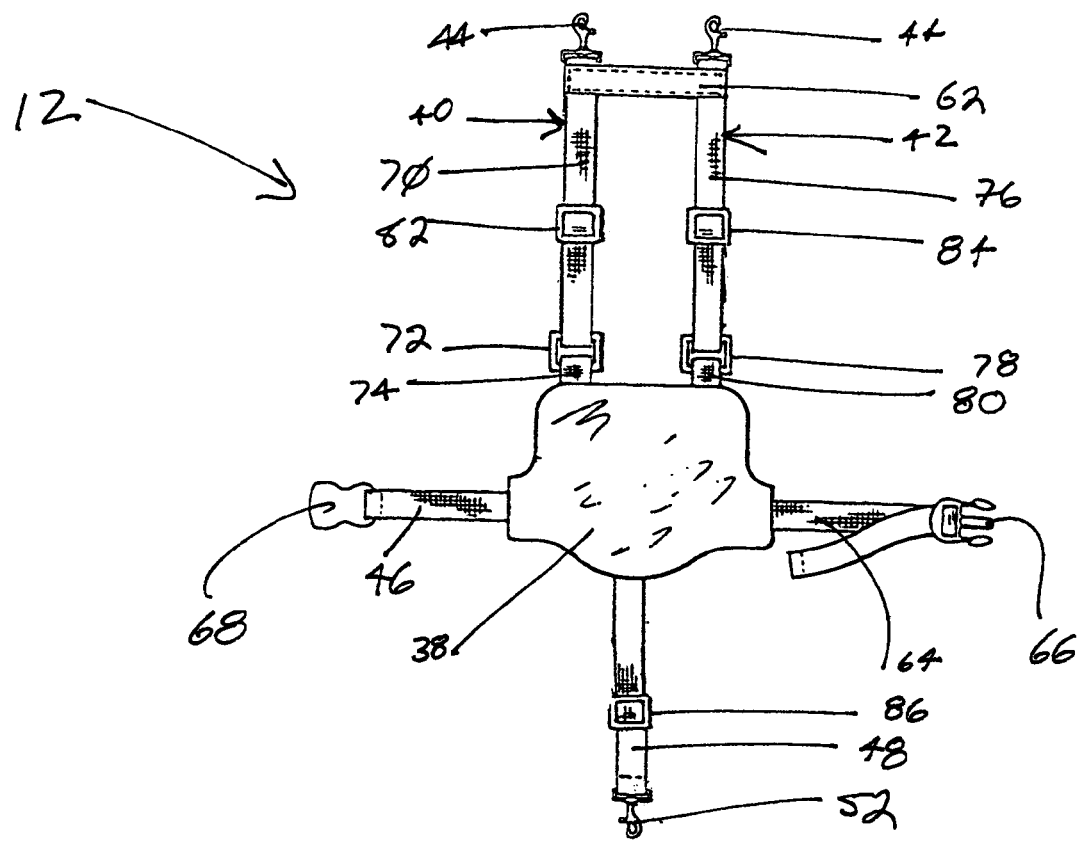
FIG. 5 is a detailed view of the illustrative embodiment of the child restraining apparatus of FIGS. 1 and 3.

A detailed view of the illustrative embodiment of child restraining apparatus 12 is shown in FIG. 5. Shoulder strap 40 illustratively comprises strap 70, ring 72, and strap 74. Similarly, shoulder strap 42 illustratively comprises strap 76, ring 78, and strap 80. Rings 72 and 78 are configured to connect the straps and may be D-rings, for example. Straps 70, 76 are attached to rings 72, 78, respectively. Straps 74, 80 are attached to rings 72, 78, respectively, as well. Straps 74, 80 are also attached to chest panel 38. In this illustrative embodiment, straps 74, 80 are sewn to chest panel 38. It is appreciated, however, that shoulder straps 40, 42 may be attached to chest panel 38 through a variety of means, including fasteners or clasps, for example, clasps 44. (See, also, FIGS. 1 and 3.) In this illustrative embodiment, straps 70, 74 are connected to ring 72, allowing for adjustability thereof. It is appreciated that straps 70, 74 may be attached to ring 72 through a variety of means discussed in, but not limited to, the foregoing. Straps 76, 80 are illustratively attached to ring 78, similar to straps 70, 74 as discussed in the foregoing. Straps 76, 80 may also be attached through a variety of means, similar to that of straps 70, 74. Support strap 62 is illustratively shown to be sewn to shoulder straps 40, 42. It is appreciated, however, that support strap 62 may be attached to shoulder straps 40, 42 through a variety of means, such as snaps, fasteners or hooks, for example.

Straps 70, 76 also illustratively have strap adjusters 82, 84, respectively. Strap adjusters 82, 84 allow the length of straps 70, 76 to be adjusted with respect to chest panel 38. Crotch strap 48 includes strap adjuster 86, which allows the length of crotch strap 48 to be adjusted with respect to chest panel 38. In this illustrative embodiment, buckle 66 is adjustable along belt strap 64 so that different sizes of torsos may be accommodated. Belt strap 64 illustratively loops through buckle 66 for attachment while allowing for adjustment.

Figure 6:
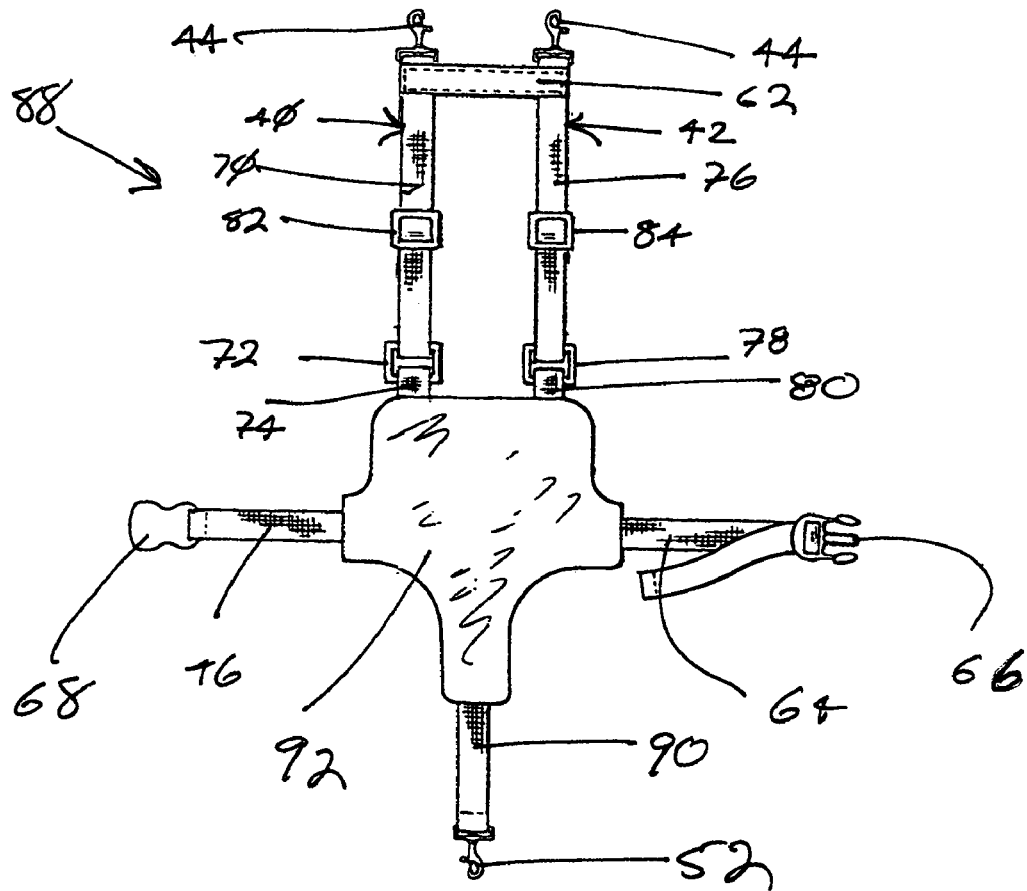
FIG. 6 is a detailed view of another embodiment of a child restraining apparatus.

A detailed view of another illustrative embodiment of a child restraining apparatus 88 is shown in FIG. 6. Child restraining apparatus 88 is similar to child restraining apparatus 12 shown in FIG. 2, with the exception of crotch strap 90, which does not have a strap adjuster to adjust the length of crotch strap 90.

Figure 7:
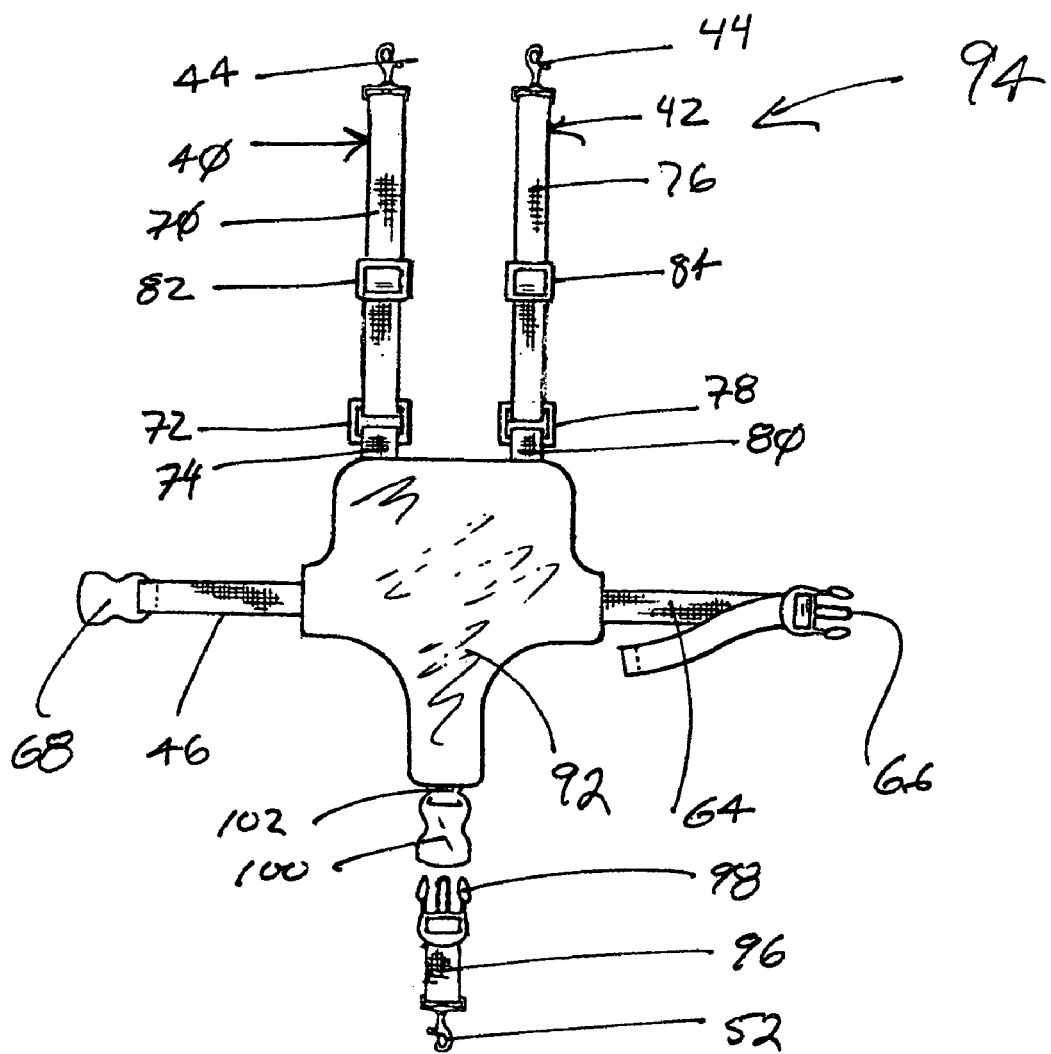
FIG. 7 is a detailed view of another embodiment of a child restraining apparatus.

A detailed view of another illustrative embodiment of a child restraining apparatus 94 is shown in FIG. 7. Child restraining apparatus 94 is similar to that of child restraining apparatus 88, illustratively shown in FIG. 6. Child restraining apparatus 94, however, does not include support strap 62. In addition, crotch strap 96 is selectively attachable to chest panel 92. This selective attachment is accomplished through the connection between buckle portions 98, 100, similar to that of buckle portions 66, 68 described in the foregoing. (See, also, FIG. 3.) Buckle portion 100 is illustratively attached to strap 102 by strap 102 looping through buckle portion 100 and strap 102 being sewn to itself. Strap 102 is also illustratively shown to be attached to chest panel 92. This attachment is illustratively accomplished by strap 102 being sewn to chest panel 92. It is appreciated, however, that buckle portion 100 can be attached to chest panel 92 through a variety of alternative means, including clasps or snaps, for example. Buckle portion 98 is illustratively attached to crotch strap 96 by crotch strap 96 looping through buckle portion 98. This method of attachment allows the length of crotch strap 96 to be adjustable with respect to chest panel 92. It is further appreciated that crotch strap 96 can be attached to buckle portion 98 through a variety of alternative means including clasps or snaps.

Figure 8:
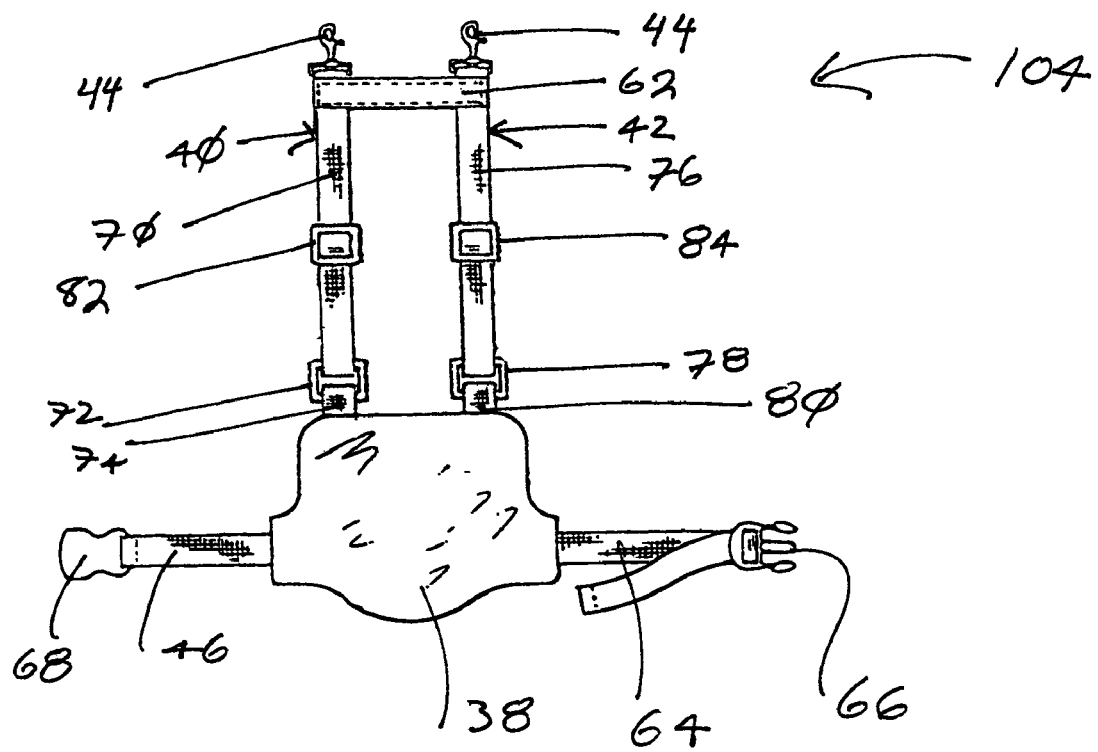
FIG. 8 is a detailed view of another embodiment of a child restraining apparatus.

A detailed view of another illustrative embodiment of child restraining apparatus 104 is shown in FIG. 8. Child restraining apparatus 104 is similar to child restraining apparatus 12, with the exception that child restraining apparatus 104 does not include a crotch strap 48.

Figure 9:
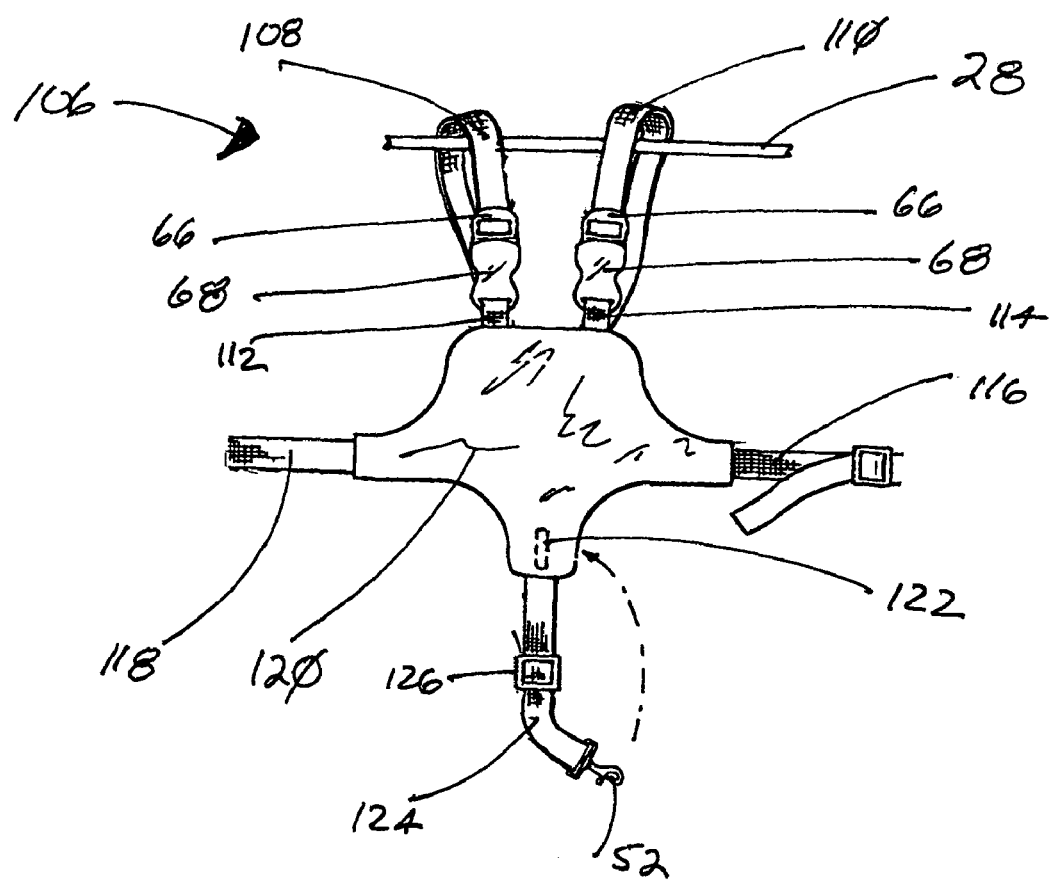
FIG. 9 is a detailed view of another embodiment of a child restraining apparatus.

A detailed view of another illustrative embodiment of child restraining apparatus 106 is shown in FIG. 9. Child restraining apparatus 106 comprises shoulder straps 108, 110. Shoulder straps 108, 110 each have two ends, with one end of each connected to chest panel 120. Chest panel 120 is similar to that of chest panel 38 of apparatus 12 differing only in relative size. (See, also, FIG. 1.) Child restraining apparatus 106 is configured to permit shoulder straps 108, 110 to extend about a shopping cart bar similar to bar 28 of shopping cart 10. (See, also, FIG. 3.) Shoulder straps 108, 110 extend around bar 28, with the other ends of shoulder straps 108, 110 being selectively attachable to chest panel 120, as illustratively shown in FIG. 9. Shoulder straps 108, 110 are attached to buckle portions 66, as illustratively shown in FIG. 9. The attachment is made by shoulder straps 108, 110 each looping through their respective buckle portions 66, with the configuration allowing for the adjustment of the length of shoulder strap 108, 110 with respect to chest panel 120. Buckle portions 66 are selectively attachable to buckle portions 68, similar to that previously discussed. Straps 112, 114 are illustratively attached to chest panel 120, similar to straps 74, 80 of child restraining apparatus 12. The attachment between straps 112, 114 and their respective buckle portions 68 are, too, similar to that described with respect to the attachment of rings 72 and 78 with straps 74, 80, respectively, of child restraining apparatus 12. Belt straps 116, 118 are attached to chest panel 120, similar to the attachment of belt straps 46, 64 with chest panel 38 as described with respect to apparatus 12 shown in FIG. 1. The belt straps may also be selectively attachable with each other by means similar to belt straps 46, 64 shown in FIG. 3. Crotch strap 124 is attached to chest panel 120, similar to the attachment between crotch strap 48 and chest panel 38 as illustratively shown in FIG. 1. Buckle 126 is also similar to strap adjuster 86 shown in FIG. 1. Loop 122 is illustratively shown to be attached to the backside of chest panel 120.

Figure 10:
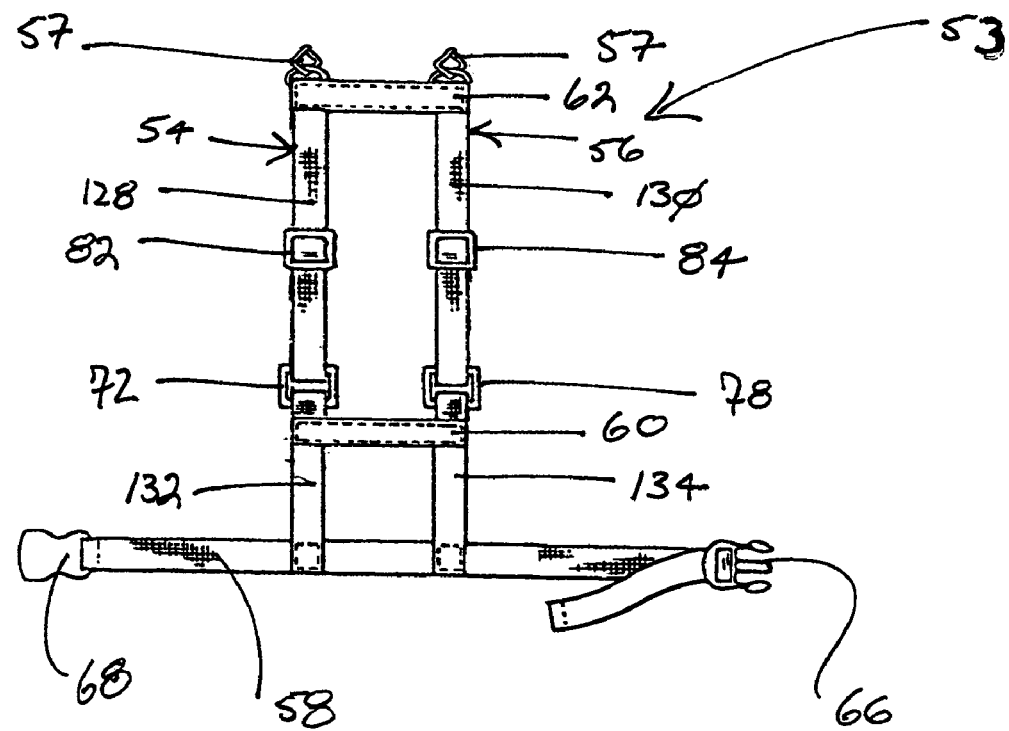
FIG. 10 is a detailed view of another embodiment of a child restraining apparatus.

A detailed view of the illustrative embodiment of child restraining apparatus 53 is shown in FIG. 10. Child restraining apparatus 53 is similar to child apparatus 146 of FIGS. 2, 4 and 14, except straps 148, 150 of child restraining apparatus 146 are replaced by strap 60 in child restraining apparatus 53. Shoulder strap 54 comprises strap 128, ring 72, and strap 132. Shoulder strap 56 similarly comprises strap 130, ring 78, and strap 134. Straps 128, 130 each have a strap adjuster 82, 84, respectively. Straps 128, 130 attach to rings 72, 78, respectively, similar to the attachment of straps 70, 76 to rings 72, 78, respectively. Straps 132, 134 attach to rings 72, 78, respectively, similar to how straps 74, 80 attach to rings 72, 78, respectively.

Figure 11:
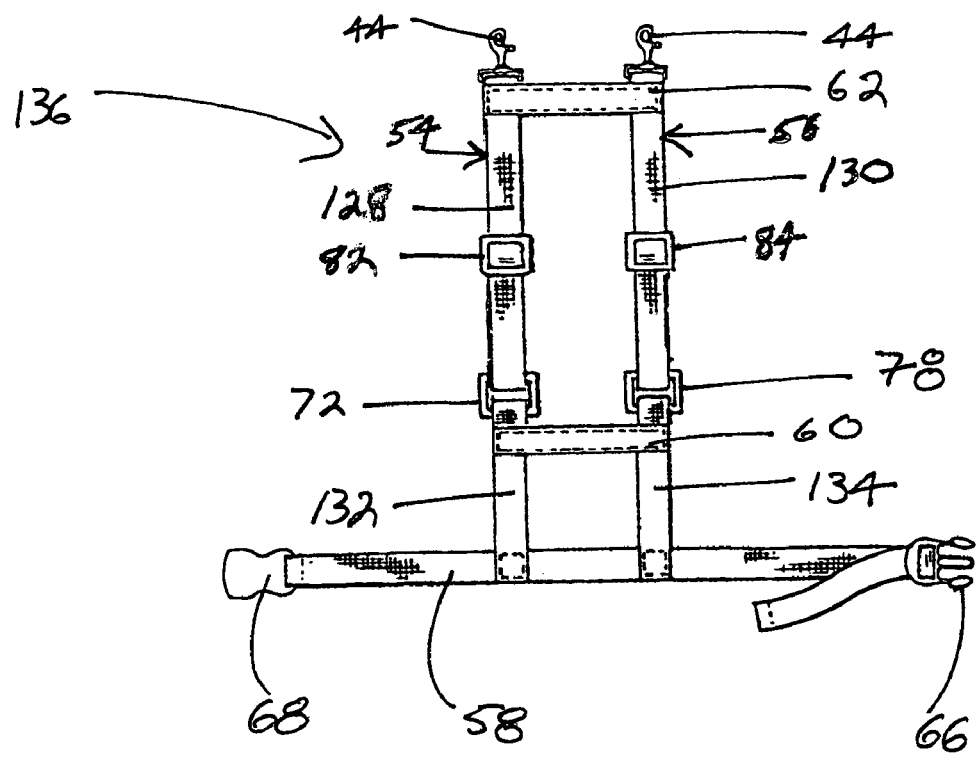
FIG. 11 is a detailed view of another embodiment of a child restraining apparatus.

A detailed view of another illustrative embodiment of child restraining apparatus 136 is shown in FIG. 11. Child restraining apparatus 136 is similar to that of child restraining apparatus 53 as illustratively shown in FIG. 10. Clasps 44, however, replace clasps 57 used on child restraining apparatus 53.

Figure 12:
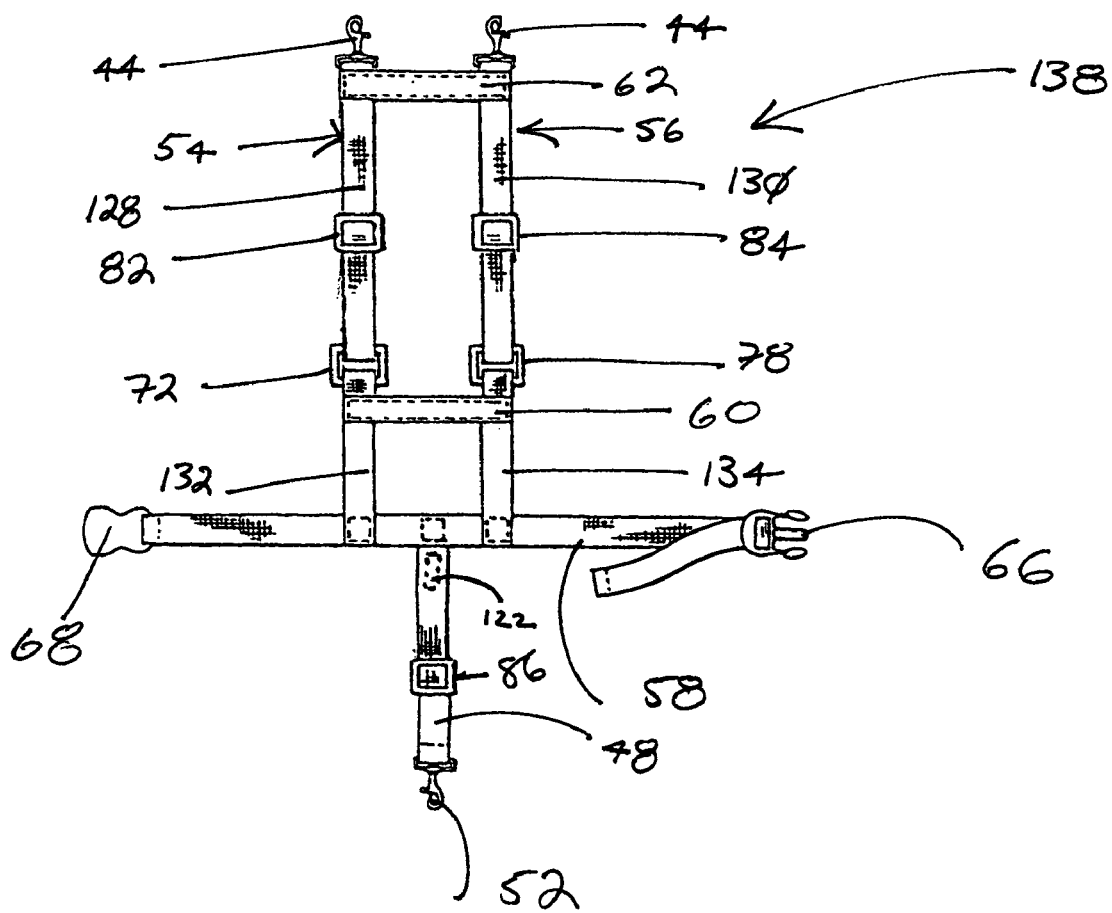
FIG. 12 is a detailed view of another embodiment of a child restraining apparatus.

A detailed view of another illustrative embodiment of child restraining apparatus 138 is shown in FIG. 12. This embodiment is similar to child restraining apparatus 136 illustratively shown in FIG. 11, except that child restraining apparatus 138 has crotch strap 48. Crotch strap 48 is illustratively attached to belt strap 58. The attachment in this embodiment is accomplished by crotch strap 48 being sewn to belt strap 58. Loop 122 is illustratively shown to be attached to the backside of crotch strap 48.

Figure 13:
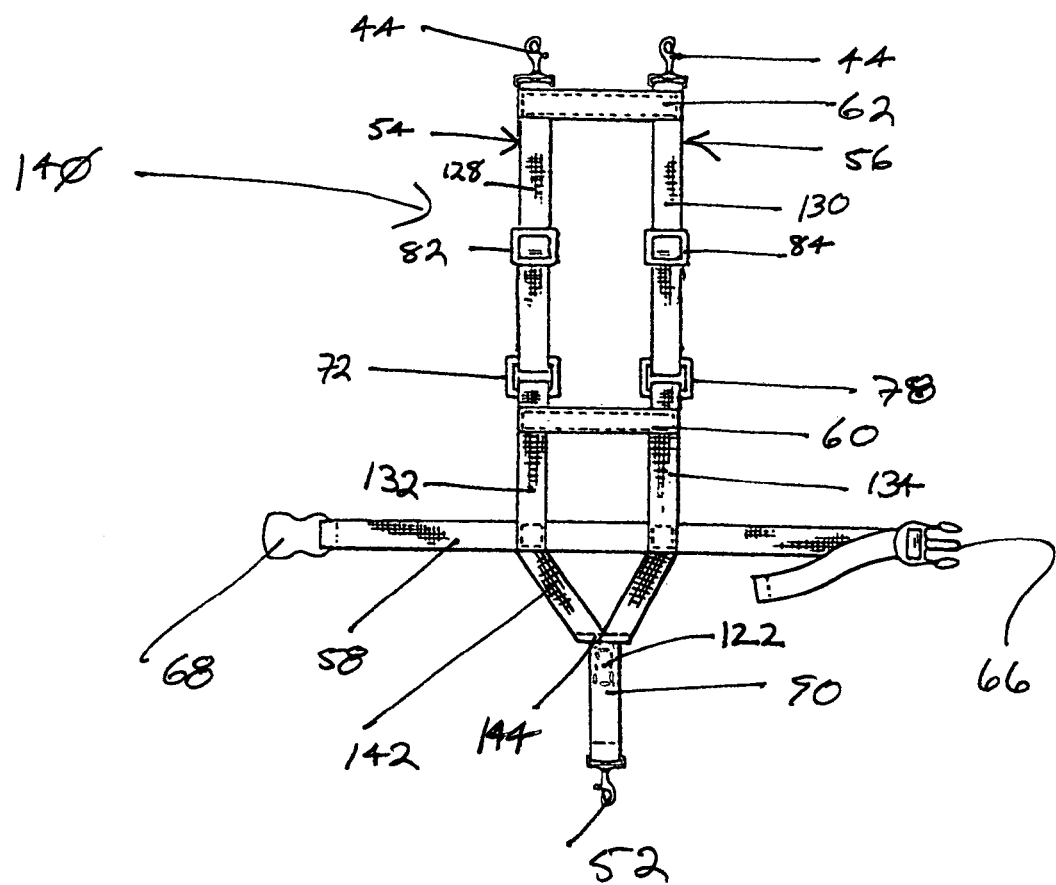
FIG. 13 is a detailed view of another embodiment of a child restraining apparatus.

A detailed view of another illustrative embodiment of child restraining apparatus 140 is shown in FIG. 13. Child restraining apparatus 140 is similar to child restraining apparatus 136 illustratively shown in FIG. 11. Child restraining apparatus 140, however, includes strap 142 and crotch strap 90. Strap 142 has two ends, with both being illustratively attached to belt strap 58. In this illustrative embodiment, both ends of strap 142 are sewn to belt strap 58. It is appreciated that strap 142 may be attached to belt strap 58 by various means, such as snaps, fasteners or clasps. In this illustrative embodiment, strap 142 is made into a V-shape by seam 144 being sewn through strap 142. Crotch strap 90 is attached to strap 142, similar to how crotch strap 90 is attached to chest panel 92, as shown in FIG. 6. Loop 122 is illustratively shown to be attached to the backside of crotch strap 90.

Figure 14:
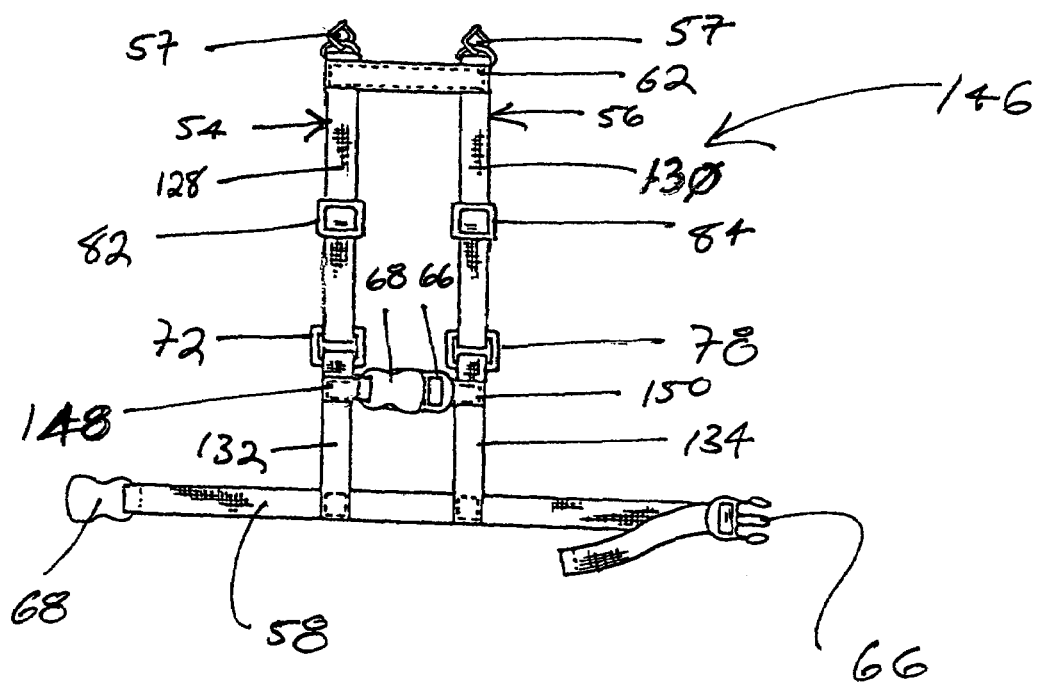
FIG. 14 is a detailed view of the illustrative embodiment of the child restraining apparatus of FIGS. 2 and 4.

A detailed view the illustrative embodiment of child restraining apparatus 146 of FIGS. 2 and 4 is shown in FIG. 14. The attachments of straps 148, 150 to their respective buckles, 68, 66 are illustratively made by straps 148, 150 looping through their respective buckles, 68, 66, then being sewn to themselves. It is appreciated that these attachments can by made in various ways, such as snaps, fasteners or clasps, for example.

Figure 15:
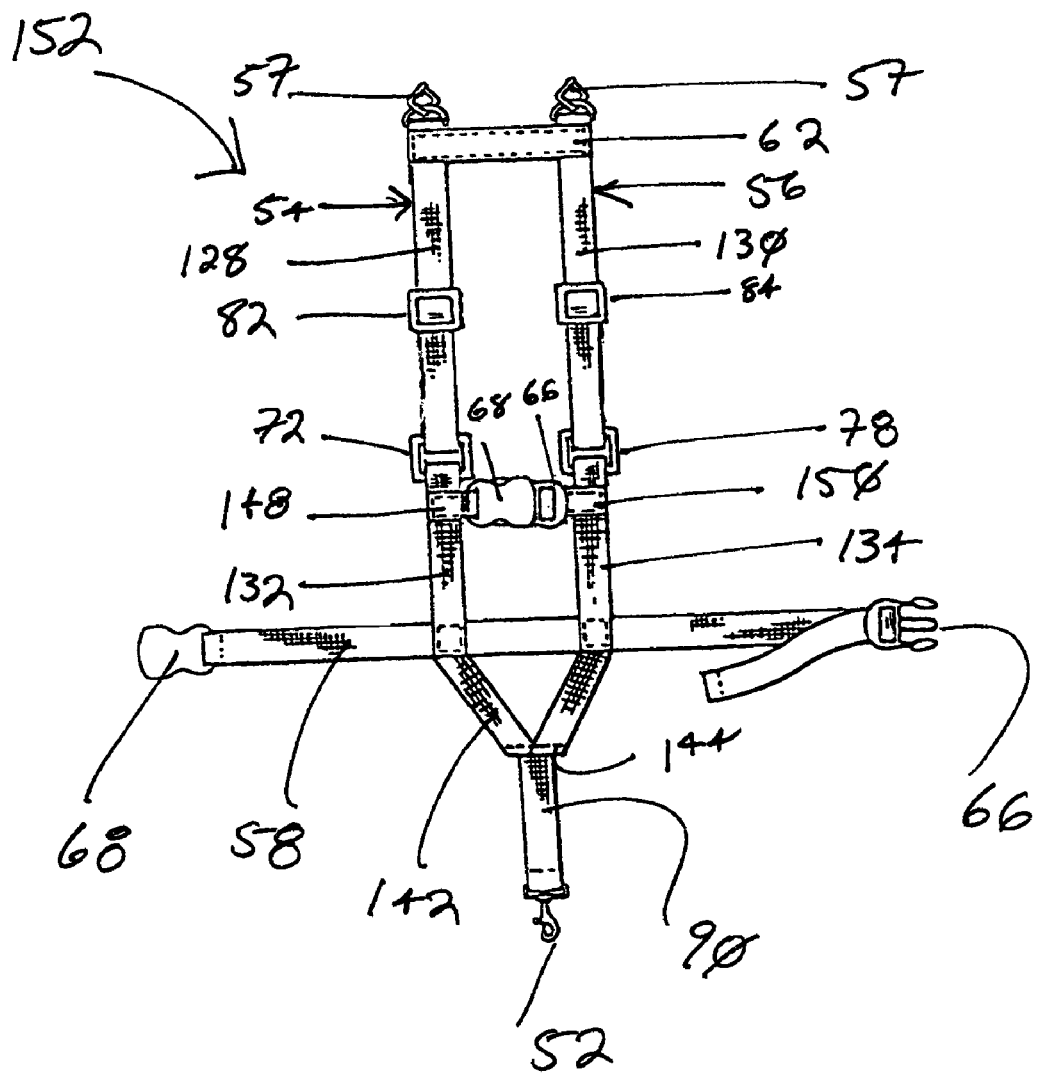
FIG. 15 is a detailed view of another embodiment of a child restraining apparatus.

A detailed view of another illustrative embodiment of child restraining apparatus 152 is shown in FIG. 15. Child restraining apparatus 152 is similar to child restraining apparatus 146, shown in FIG. 14. Child restraining apparatus 152, however, includes strap 142 and crotch strap 90, similar to that of child restraining apparatus 140, as shown in FIG. 13.

Figure 16:
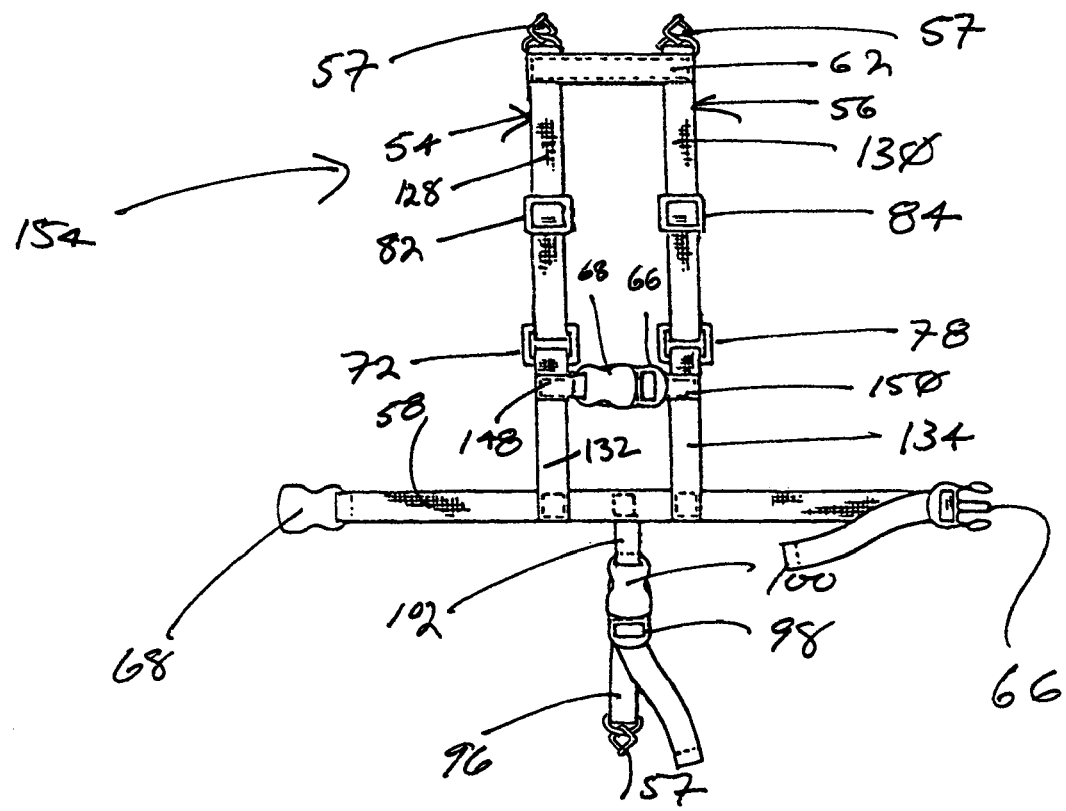
FIG. 16 is a detailed view of another embodiment of a child restraining apparatus.

A detailed view of another illustrative embodiment of child restraining apparatus 154 is shown in FIG. 16. Child restraining apparatus 154 is similar to child restraining apparatus 146, shown in FIG. 14. Child restraining apparatus 154, however, includes a strap 102, buckle portions 98, 100, and crotch strap 96, similar to child restraining apparatus 94, shown in FIG. 7. The attachment of strap 102 to belt strap 58 is similar to the attachment of strap 102 to chest panel 92, as previously described. Child restraining apparatus 154 also comprises a clasp 57.

Figure 17:
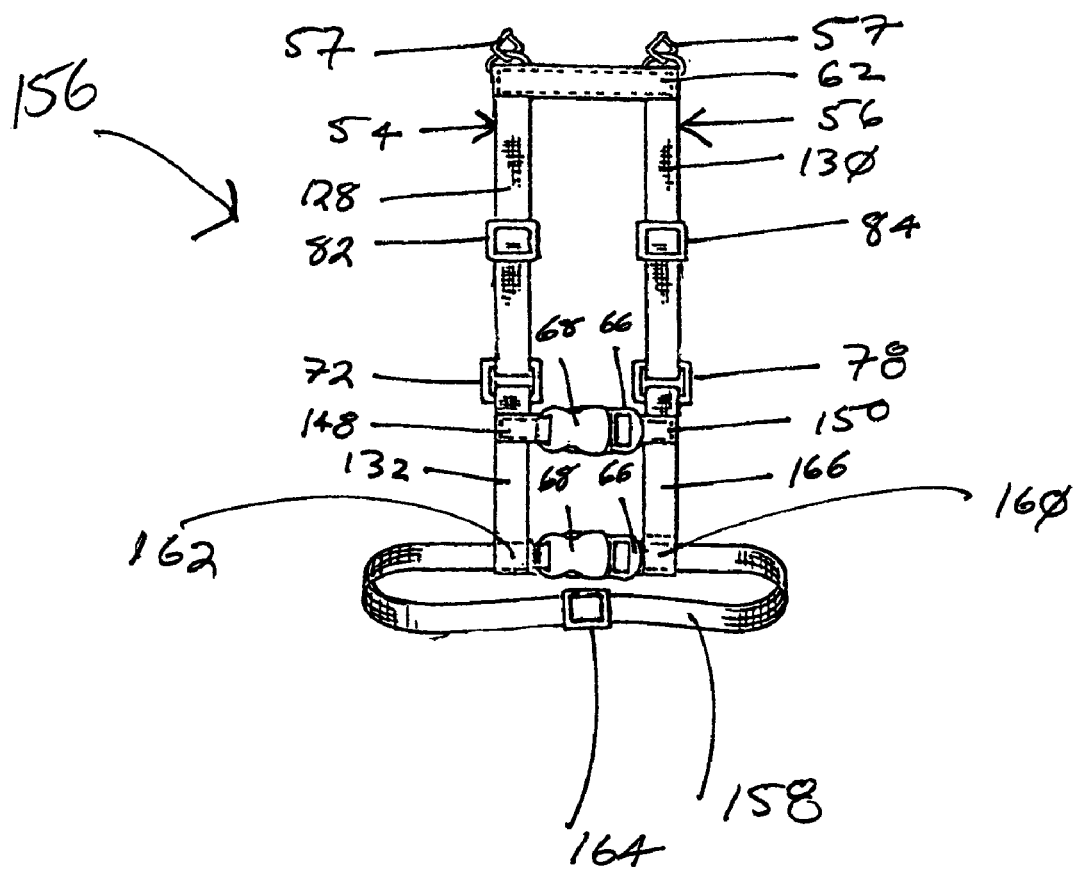
FIG. 17 is a detailed view of another embodiment of a child restraining apparatus.

A detailed view of another illustrative embodiment of child restraining apparatus 156 is shown in FIG. 17. Child restraining apparatus 156 is similar to child restraining apparatus 146, shown in FIG. 14, but for strap 166 in place of strap 134. Strap 166 has loop 160 on one of its ends. Child restraining apparatus 156 also comprises belt strap 158 as illustratively shown. Belt strap 158 is attached to strap 132 at attachment 162. This attachment is made by strap 132 being sewn to belt strap 158, similar to that previously discussed. Belt strap 158 has two ends which are selectively attachable via buckle portions 66, 68. The end of belt strap 158, having buckle portion 66, is able to pass through loop 160 and connect with buckle portion 68. (See FIG. 18.) Belt strap 158 also illustratively includes strap adjuster 164 which is adjustable about the torso of a juvenile.

Figure 18:
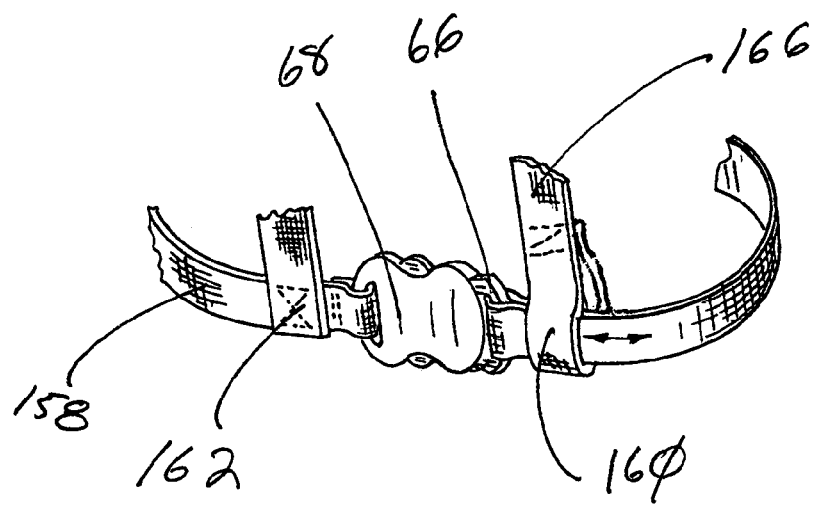
FIG. 18 is a detailed view of a portion of the embodiment a child restraining apparatus of FIG. 17.

A detailed view of a portion of belt strap 158 of child restraining apparatus 156 is shown in FIG. 18. This view illustratively shows loop 160 and belt strap 158 passing through, allowing buckle portion 68 to connect with buckle portion 66.

Figure 19:
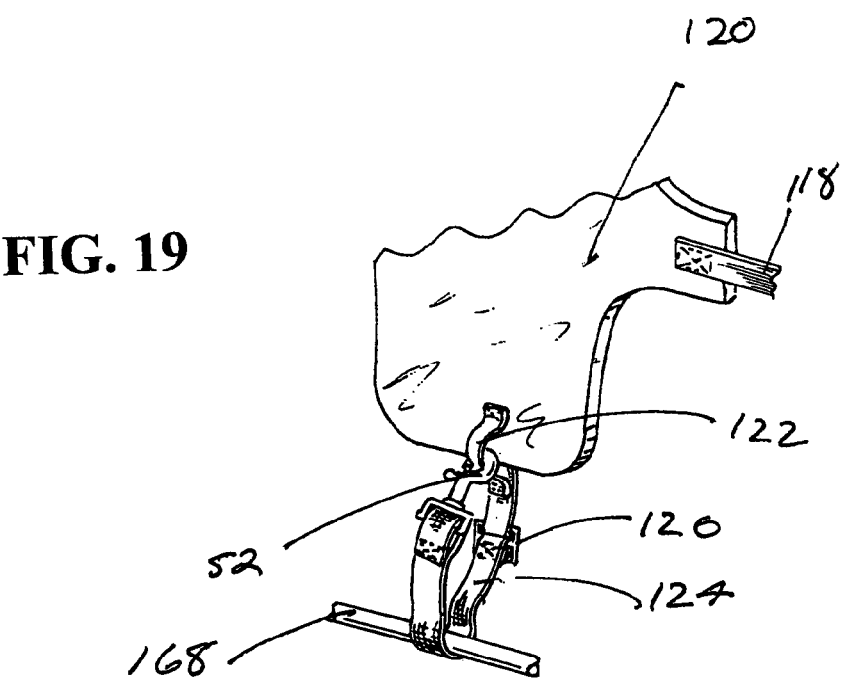
FIG. 19 is a detailed view of a portion of an embodiment of a child restraining apparatus.

A detailed view of loop 122 is shown in FIG. 19. (See, also, FIGS. 9, 12, and 13.) Loop 122 is located on the side of chest panel 120 of child restraining apparatus 106, facing a juvenile seated in a shopping cart 10. Loop 122 is illustratively attached to chest panel 120 and crotch strap 124. Attachment between loop 122 and chest panel 120 and crotch strap 124 is accomplished by loop 122 being sewn to chest panel 120 and crotch strap 124. Loop 122 allows crotch strap 124 to extend around bar 168, or any various bars associated with shopping cart 10, with clasp 52 being selectively attachable to loop 122. (See FIGS. 1 through 4.).

Loop 122 is attached to crotch straps 48, 90 of child restraining apparatus 138, 140, respectively, in the same manner of attachment as described in the foregoing. (See, also, FIGS. 12 and 13.) Loop 122 is also used in the same manner as described in the foregoing, with clasp 52 being selectively attachable to loop 122 in child restraining apparatus 138, 140. It is contemplated that loop 122 can be used with any of the illustrative embodiments used herein that comprise crotch strap.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A shopping cart having a seat for supporting a juvenile, a first bar, a second bar extending from the first bar, wherein the first and second portions are adjacent a rear portion of the seat, and a child restraining apparatus for restraining the juvenile in the seat of the shopping cart, the child restraining apparatus comprising:

first and second shoulder straps positionable over the juvenile's shoulders, each of the first and second shoulder straps having first and second ends;

wherein the first ends of the first and second shoulder straps are selectively attachable to the first bar adjacent the rear portion of the seat via clasps;

a chest panel;

wherein the second ends of the first and second shoulder straps are attached to the chest panel;

first and second belt segments, each having first and second ends such that the first ends of each of the first and second belt segments are attached to the chest panel;

wherein the first and second belt segments extend from the chest panel and are positionable about the torso of the juvenile and the second bar;

wherein the second ends of the first and second belt segments are selectively attachable to each other distal from the chest panel; and a support strap connecting to the first and second shoulder straps distal from the chest panel and adjacent the first bar.

2. The shopping cart of claim 1, wherein the child restraining apparatus further comprises a crotch strap having first and second ends;

wherein the first end of the crotch strap is attached to the chest panel; and wherein the crotch strap extends therefrom in a direction opposed to the first and second shoulder straps.

3. The shopping cart of claim 1, wherein the chest panel comprises padded material.

4. The shopping cart of claim 1, wherein the first and second shoulder straps are adjustable with respect to the chest panel.

5. The shopping cart of claim 1, wherein at least one of the first and second belt segments are adjustable with respect to the chest panel.

6. The shopping cart of claim 1, wherein the shoulder straps are positioned substantially parallel to each other.

7. The shopping cart of claim 2, wherein the second end of the crotch strap is selectively attachable to a third bar located adjacent to the seat.

8. The shopping cart of claim 2, wherein the crotch strap is adjustable with respect to the chest panel.

9. The shopping cart of claim 2, wherein the crotch strap has an attachment located adjacent to the first end thereof; and wherein the second end of the crotch strap is selectively attachable to the attachment.

10. The shopping cart of claim 2, wherein the crotch strap is selectively attachable to the child restraining apparatus.

11. The shopping cart of claim 7, wherein the second end of the crotch strap comprises a clasp.

12. The shopping cart of claim 9, wherein the second end of the crotch strap comprises a clasp.

* * * * *